G. R. KUNKLE.
SPRING MOTOR.
APPLICATION FILED JAN. 24, 1917.
1,251,972.
Patented Jan. 1, 1918.
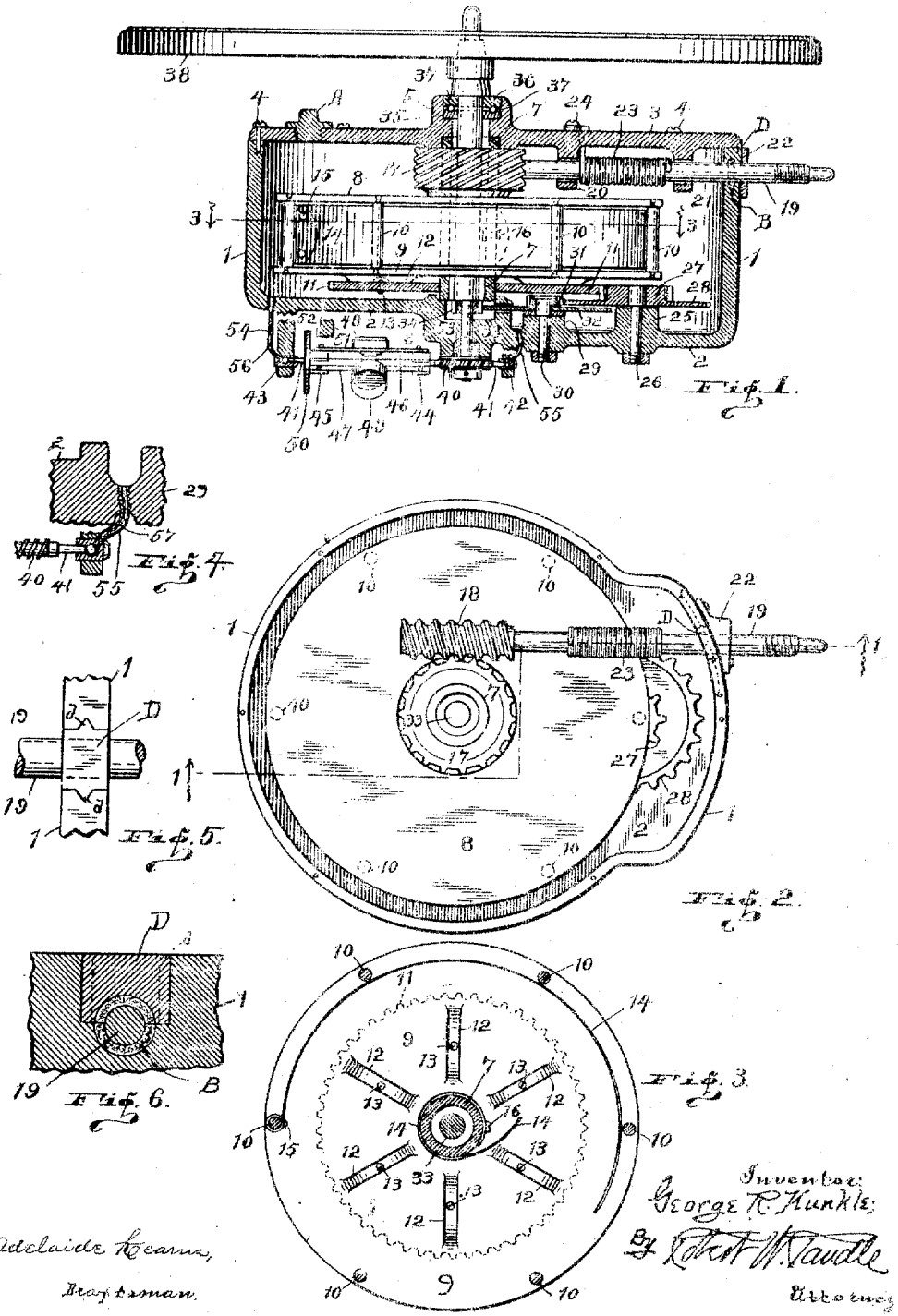

UNITED STATES PATENT OFFICE.

GEORGE R. KUNKLE, OF RICHMOND, INDIANA.

SPRING-MOTOR.

1,251,972.      Specification of Letters Patent.      Patented Jan. 1, 1918.

Application filed January 24, 1917. Serial No. 144,285.

*To all whom it may concern:*

Be it known that I, GEORGE R. KUNKLE, a citizen of the United States, residing in the city of Richmond, in the county of Wayne, State of Indiana, have invented new and useful Improvements in Spring-Motors, of which the following is a full, clear, and comprehensive specification and exposition, the same being such as will enable others to make and use the same with exactitude.

The object of my invention, broadly speaking, is to provide a spring motor which will be simple in construction and compact in its arrangement, will be strong and durable in its several parts, easily operated and controlled, which can be manufactured, installed, and sold at a comparatively low price, and above all will be absolutely noiseless in its operation.

Other objects are, to provide a spring motor which will be positive in action, regular in its operations, and automatic as to the oiling of the several bearings thereof.

Other minor objects and particular advantages of the invention will be brought out in the course of the following description, and that which is new will be correlated in the claims.

The preferred means for carrying out the principles of the invention is shown in the accompanying drawings, in which—Figure 1 is a vertical section taken through the case and certain of the mechanism therein, as on the line 1—1 of Fig. 2. Fig. 2 is a top plan view, looking down into the case after the lid or cover has been removed. Fig. 3 is horizontal section, as taken on the line 3—3 of Fig. 1, and taken in the direction indicated by the arrows. Fig. 4 is an enlarged detail section of one of the governor oilers. Fig. 5 is a plan view of the outer bearing for the winding-shaft. And Fig. 6 is a sectional view of the outer bearing for the winding-shaft, as taken on the line 6—6 of Fig. 2.

Similar indices denote like parts throughout the several views.

In order that the construction, the operation, and the advantages of my invention may be more fully understood and appreciated I will now take up a detailed description thereof, in which I will set forth the several features as briefly and as comprehensively as I may.

Referring now to the drawings in detail: The container or case is substantially round in cross section, with a swell or enlargement on one side thereof in order to accommodate certain of the gears, and it comprises the side wall 1 and the bottom 2 which is integral with the side wall, thereby providing a bowl-shaped reservoir substantially as indicated. Numeral 3 denotes the lid or cover, which is removably secured on the upper edge of the wall 1, where it is adapted to be secured by a plurality of screws 4. At any convenient point in the top 3 a cap or filler-plug A is threaded therethrough, as shown for instance in Fig. 1.

Located near the center of the cover 3 is the hub 5, which is integral therewith, and opposite thereto in the bottom 2 is the hub 6. Mounted in suitable spaces therefor in the inner ends of the hubs 5 and 6, and extending vertically therebetween, is the hollow shaft or spindle 7.

The spring barrel or cage comprises an upper disk 8 and a lower disk 9, the two being spaced apart, parallel with each other, and they are rigidly connected together by a plurality of posts 10. The barrel or cage thus formed is located around and concentric with the hollow shaft 7 upon which it may freely revolve.

Numeral 11 denotes the main drive gear wheel, shown in dotted lines in Fig. 3, and it also is concentric with the shaft 7, and it is concentric with the spring barrel, below which it is located, and to which it is rigidly secured as follows: Struck down through the disk 9 are a plurality of oblong radial depressions 12, the bottoms of which contact with the upper face of the gear 11, to which they are secured by screws or rivets 13, substantially as indicated.

Numeral 14 denotes a flat coiled spring, one end of which is secured around one of the posts 10 by one or more rivets 15. Said spring is coiled around inside the barrel with its inner end secured to the hook 16, the latter being secured to the shaft 7 in any well known manner.

Located immediately above the barrel, concentric therewith, and secured to the shaft 7, is the spiral gear 17. Numeral 18 denotes a spiral gear screw, which is located at one side of and at right angle to and in mesh with the gear 17, as in Fig. 2. Said screw 18 is secured on the inner end of the winding-shaft 19, the latter being revolubly mounted in the hangers 20 and 21 which extend down from the lid 3. The shaft 19 projects out through an aperture therefor in the wall 1, where it is provided with a plate 22. The outer end of the shaft 19 is adapted to receive a crank by which the said shaft may be rotated, as hereinafter set forth.

Coiled tightly around the shaft 19 and extending between the hangers 20 and 21 is a coil spring 23, one end of which is run up through the cover 3 and secured by the screw 24, while the other end of the spring remains free. From the above it is apparent that the shaft 19 may be freely rotated to the right, as will incline to unwind or loosen the convolutions of the spring 23, but the shaft can not be rotated to the left as this will tend to contract the coils of the spring and cause them to grasp the shaft, thereby preventing the shaft from rotating reversely.

A notch is formed in the upper edge of the wall 1, in the base of which notch fits the shaft 19, and closing said notch, after the said shaft is in position, and fitting said shaft, is the block D. The said block has a V-shaped fin $d$ in each side edge thereof and the fins are adapted to slide down and fit in corresponding grooves formed in each side edge of the said notch, as indicated.

A channel is formed in the contact face of the block D and in the base of said notch in which is located the packing B.

It is apparent that the block D and the packing B are held tight in place when the lid or cover 3 is secured as in Fig. 1.

Extending up from the bottom 2 is the hub 25, and extending through said hub is the axle 26, on which is mounted the pinion 27 and the gear-wheel 28. The said pinion and gear-wheel being integral and concentric with each other, and they rest upon the upper end of the hub 25. The pinion 27 is located in mesh with the gear-wheel 11 and is driven thereby, as hereinafter followed out.

Also extending up from the bottom 2 is the hub 29, and extending through the hub 29 is the axle 30, on which is mounted the pinion 31 and the gear-wheel 32, the two being integral with each other, and they rest upon the upper end of the hub 29.

The gear-wheel 28 meshes with the pinion 31 which it drives.

Extending through beyond the shaft 7 is the driven shaft 33, the lower end of the shaft 33 is mounted in the hub 6, through which it extends, and its upper end is carried by the hub 5, in the manner hereinafter specified.

Secured around the shaft 33 immediately adjoining the lower end of the shaft 7, is the pinion 34 which meshes with the gear-wheel 32 and by which it is driven.

At a point above the shaft 7 the shaft 33 is supported and centered by a ball-bearing which is located in the outer end of the hub 5. The lower ball-race 35 is secured in the hub 5, while the upper ball-race 36 is secured around the shaft 33, with the balls 37 operating in the race-way therebetween, as shown.

Mounted on the upper end portion of the shaft 33, and above the hub 5, is the turntable 38, which is the element to be driven.

Secured on the lower projecting portion of the shaft 33 is the spiral-gear 39 with which meshes at right-angles thereto the spiral-screw 40. The screw 40 is secured on the governor-shaft 41, the latter being revolubly mounted at its ends in the bearings 42 and 43 in any well known manner.

The governor comprises a fixed spider 44 secured to the shaft 41 and located near the screw 40, and a slidable spider 45 which is movable along on said shaft 41. Connecting said spiders are the thin springs 46 and 47 and they normally extend parallel with the shaft 41. Secured to the center of each of the springs 46 and 47 are the respective weights 48 and 49. Secured to the spider 45 and revoluble therewith and slidable on the shaft 41 is the disk 50.

Numeral 51 denotes a projection from the bottom 2, and on its face is a felt pad 52 against which the disk 50 is adapted to engage when the disk is moved to the right a short distance.

The lower end of the shaft 33 is provided with packing 53 to prevent the escape of oil. Also packing B should be placed around the shaft 19 where it passes through the wall 1, in order to prevent the escape of oil at that point.

Leading from the interior of the case are two pipes or ducts 54 and 55, which extend into the respective bearings 43 and 44, to supply oil to the ends of the shaft 41. Wicks 56 and 57 should be placed in each of the ducts to retard the oil beyond that required to properly oil the ends of the shaft 41.

After the mechanism is assembled as shown and described the filler plug A may be removed and the interior of the case should be filled, or nearly so, with suitable fluid oil, then after the plug A is replaced the motor will be ready for operation to function in the manner for which it is intended.

First the spring 14 should be wound to the desired tension, by simply turning the shaft 19 to the right, which manifestly will cause the gear 18 to turn the gear 17 and it in turn will rotate the hollow shaft 7, thereby causing the spring to wind from the center thereof.

After the spring is wound then the power thereof will be exerted to turn the barrel, carrying with it the gear 11, from which the power will be exerted through the intermediate gears to the pinion 34, and the latter will of course turn the shaft 33 and the latter will carry with it the turn-table 38, thereby accomplishing the desideratum of the mechanism. Now as the mechanism speeds up to a certain rate the centrifugal force of the rotating weights 48 and 49 will bow out the springs 46 and 47, thereby bringing the disk 50 into frictional contact with the felt 52 and thereby reduce the speed, or rather holding the speed at a uniform rate.

As probably will have been observed, the most prominent features of this invention are: (a) The means whereby various mechanisms operate continuously in fluid oil, thereby minimizing the noise which would result from the operation of the mechanism, also dispensing with the necessity of frequent oiling, and adding to the life of the mechanism; (b) The hollow axle to which the inner end of the power spring is attached, with the driven shaft extending through the hollow shaft, thereby enabling the mechanism to be arranged in compact form, causing the mechanism to be more simple than it otherwise would be, and reducing the cost of production to an appreciable extent; and (c) The novel means for oiling the governor, which of necessity is located outside of the oil case.

I desire that it be understood that various changes may be made in the several details of construction and arrangement without departing from the spirit of the invention and without sacrificing any of the advantages thereof.

Having now fully shown and described my invention, what I claim, and desire to secure by Letters Patent of the United States, is—

1. A spring motor comprising an inclosed case, a vertical hollow shaft located entirely within the case, a spring-cage revolubly mounted around and concentric of said shaft, a coil spring located in said cage with its inner end secured to said shaft and its outer end secured to the cage, a main drive gear located below said cage and secured thereto, a driven shaft extending through the hollow shaft and without contact therewith and projecting through the case both above and below, a ball-bearing carried by the upper part of the case by which the driven shaft is suspended, a turn-table secured to the upper projecting end of the driven shaft, a governor connected to the lower projecting end of the driven shaft, a spiral gear located in the case above said cage and secured to the hollow shaft, a spiral gear meshing at right-angles with the first mentioned spiral gear, a winding shaft extending outside the case from the second spiral gear, a pinion secured to the driven shaft below the hollow shaft, and a train of gears connecting said pinion with said main drive gear, all substantially as set forth.

2. A spring motor comprising a case including a removable cover, a hub in said cover, a ball-bearing mounted in the hub, a driven-shaft supported by said ball-bearing and projecting through the case both above and below, a hollow shaft mounted entirely in the case concentric with the driven shaft but spaced therefrom, means for manually revolving the hollow shaft, a spring cage adapted to revolve around the hollow shaft concentric therewith but independent thereof, a coil spring contained in said cage with its inner end attached to the hollow shaft and its outer end attached to said cage, a main gear wheel located below said cage, depressions extending down from the cage, means for securing the depressions to said main gear, a pinion secured to the driven shaft immediately below the lower end of the hollow shaft, a pinion meshing with the main gear, a second gear integral with the last mentioned pinion, a pinion meshing with said second gear, a third gear integral with the last mentioned pinion and meshing with the said pinion attached to the driven shaft, all of the intermediate gears and pinions being located to one side of the driven shaft, and a governor located below the case and on the side of the driven shaft opposite to that of said gears and pinions, all substantially as set forth.

3. A spring motor including a case having a removable cover, a hub integral with the cover, a driven shaft projecting through the hub and the interior of the case and projecting below the case, means for suspending the said shaft in vertical rotative position, a turn-table attached to the upper projecting end of said shaft, a governor geared to the lower projecting end of said shaft, a hollow shaft concentric of the driven shaft and spaced therefrom and having its ends located in bearing within the case and adapted to rotate in one direction only, means for manually rotating the hollow shaft, a spring cage concentric of and having the hollow shaft as its axis, said cage comprising an upper disk, a lower disk spaced from the upper disk, a post connecting the peripheries of said disks, a spring contained in said cage with its inner end connected to the hollow shaft and with its outer end connected to one of said posts, a main gear connected concentric of and below said cage and carried thereby, a pinion secured to the driven shaft and adjoining the lower end of the hollow shaft, a pair of intermediate pinions, and a pair of intermediate gears, meshing together and with the main gear and the first mentioned pinion, axles for said intermediate gears and pinions which axles are secured in the bottom of the case, and spiral gears connecting the driven shaft and the governor, all substantially as shown and described.

In testimony whereof I have hereunto subscribed my name to this specification in the presence of two subscribing witnesses.

GEORGE R. KUNKLE.

Witnesses:
ROBT. W. RANDLE.
R. E. RANDLE.